United States Patent Office
3,501,260
Patented Mar. 17, 1970

3,501,260
POLYVINYL ALCOHOL AND STARCH BOUND TO CELLULOSIC TEXTILE SUBSTRATE THROUGH REACTION WITH BETA-OXYETHYL SULFONES
Giuliana C. Tesoro, Dobbs Ferry, N.Y., assignor to J. P. Stevens & Co., Inc., New York, N.Y., a corporation of Delaware
No Drawing. Original application Dec. 20, 1960, Ser. No. 77,027. Divided and this application Mar. 18, 1964, Ser. No. 352,946
Int. Cl. D06m *11/18, 13/54*
U.S. Cl. 8—115.6          2 Claims

ABSTRACT OF THE DISCLOSURE

Treatment of soluble polymers containing free hydroxyl groups with polyfunctional beta-oxyethyl sulfones. Sizing of textiles is included.

---

The present invention relates to new chemical products, including chemically modified polymeric materials and process for the manufacture thereof.

More particularly, the present invention relates to novel processes of reacting soluble polymers containing a plurality of free hydroxyl groups per polymeric molecule with certain polyfunctional compounds and products produced thereby.

This application is a division of copending application Ser. No. 77,027, filed Dec. 20, 1960, now abandoned, which in turn is a continuation-in-part of application Ser. No. 41,805 filed July 11, 1960, and now abandoned.

The soluble polymers employed for purposes of the present invention contain free hydroxyl groups and include, but are not limited to polyvinyl alcohol, starch and the like. The invention also contemplates the reaction of polymers containing active hydrogens (other than the hydrogens in the hydroxyl groups) including polyamines, polyamides, keratins, and the like with polyfunctional compounds.

Various embodiments of the invention are described hereinafter in connection with novel processes for reacting soluble polymers containing a plurality of hydroxyl groups per polymeric molecule, with polyfunctional sulfones to produce novel sulfone ethers having valuable and highly desirable properties which render them useful in the textile and other arts.

Applicant has made the unexpected discovery that it is possible to react substituted and unsubstituted beta oxyethyl sulfones such as polyhydroxyethyl or polyalkoxyethyl sulfones with soluble polymers containing free hydroxyl groups under mild reaction conditions and in the virtual absence of water. Short reaction times and moderate temperatures may be employed in the presence of mildly alkaline catalysts. When strong alkaline catalysts are used, the amount required is low so that damage to the polymer is avoided even in the presence of strong alkali. For example concentrations of alkali hydroxide ranging from about 0.5% to about 5%, based on the weight of the solution used are effective. Since the reaction between the beta-oxyethyl sulfones and the polymer takes place on heating after the water has been essentially removed from the system, the prence of a strong alkaline catalyst under these conditions does not dissolve or degrade the polymer. The necessity for employing expensive, toxic, or otherwise commercially objectionable reagents to effect cross-linking of polymeric materials is also avoided since the beta-oxyethyl sulfones and the alkaline catalysts are easily handled in commercial equipment without requiring special ventilation, corrosion-proof equipment or unusual safety precautions.

Accordingly, it is an object of the present invention to provide new and useful polymeric materials which are prepared by crosslinking soluble polymers containing a plurality of free hydroxyl groups per polymeric molecule with polyfunctional sulfone compounds.

It is a further object of this invention to provide a novel process for crosslinking the aforementioned polymers that will not require heating in the presence of an acidic catalyst, or treatment in the presence of high concentrations of strong aqueous alkali, thereby avoiding degradation of said polymers.

It is a further object of this invention to provide a novel process for crosslinking the aforementioned polymers by employing reactants which do not contain or liberate odoriferous, lachrymatory or vesicant components during the reaction.

Further objects of the present invention will become apparent from the description which follows.

The above and other objects of this invention are accomplished by crosslinking polymeric materials containing a plurality of free hydroxy groups per polymeric molecule in the presence of an alkaline material under mild reaction conditions with a poly beta-hydroxyethyl or poly beta-alkoxyethyl sulfone represented by the structural formula:

(I)      $(ROCH_2CH_2SO_2)_nQ_n$ where R is hydrogen or a lower alkyl group containing from 1 to 4 carbon atoms, $n$ is an integer and has a value from 2 to 4, and Q is an organic radical such as an aliphatic, aromatic or alkylaromatic residue with a valence equal to the value of $n$.

For purposes of this invention the soluble polymeric materials containing a plurality of free hydroxyl groups per polymeric molecule are designated as:

Pol-OH and those polymeric materials some of the free hydroxyl groups of which have been reacted as indicated herein, being designated as:

Pol-

The sulfones which are contemplated by this invention may also be designated by the structure:

(II)      $ROCH_2CH_2SO_2M$ where R is hydrogen or lower alkyl, M is selected from the group consisting of $ROCH_2CH_2$— and $(ROCH_2CH_2SO_2)_{n-1}Q_n$— where Q is an organic radical such as an aliphatic, aromatic, or alkylaromatic residue with a valence equal to the value of $n$, and $n$ is an integer and has a value of 1 to 3.

For example, Q may be an aliphatic hydrocarbon radical such as —$C_3H_6$—, —$C_4H_8$—, —$C_5H_{10}$—, a substituted hydrocarbon radical such as

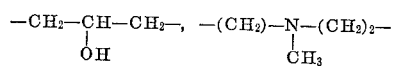

an alkylaromatic radical such as —$CH_2C_6H_4CH_2$—, or an aromatic radical such as —$C_6H_4$—.

A preferred group of the aforementioned sulfones coming within the scope of Formula II are the bis beta-hydroxyethyl and bis beta-alkoxyethyl sulfones of the formula:

(III)      $ROCH_2CH_2(SO_2)_aQ_aSO_2CH_2CH_2OR$ where R is hydrogen or lower alkyl, i.e. $CH_3$ to $C_4H_9$ and where $a$ has a value of 0 or 1, and Q is an organic radical such as an aliphatic, aromatic, or alkylaromatic residue.

While compounds coming within the scope of the Formulae I, II and III above can generally be used for the process of this invention, those which are soluble in water are particularly desirable, since the use of solvents other than water for commercial processing of polymeric materials is costly or hazardous, and often both. The water solubility of the compounds represented by the foregoing formulae is largely a function of the structure of the group Q, and we have found that compounds of the following formula have excellent water solubility, coupled with extraordinary effectiveness in the crosslinking reaction:

(IV) 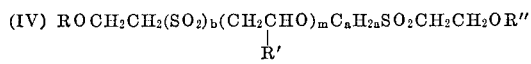

in which $a$ has a value from 0 to 5, $b$ has a value from 0 to 1, $m$ has a value from 0 to 5, but if $m$ has a value of 1 to 5, then $a$ has a value of 2 to 3 only, and $b$ is 0 only if both $a$ and $m$ are 0, R and R'' are hydrogen or lower alkyl, and R' is selected from the group consisting of hydrogen and methyl.

In addition a group of compounds related to Formula IV compounds have also proven effective in crosslinking polymeric materials and correspond to the formula (V) $HOCH_2CH_2SO_2(CH_2CH_2O)_n$
$CH_2CH_2SO_2CH_2CH_2OH$ where $n$ has a value from 2 to 12.

Included among the sulfones of Formula I are new sulfones which are expressed by the following formula:

(VI) $(ROCH_2CH_2SO_2)_nQ_n$ where R is hydrogen or a lower alkyl having 1 to 4 carbon atoms, $n$ is the number of unsatisfied valences and has a value of 2 to 4 and Q is an alkyl, aromatic, or alkylaromatic radical containing at least 3 carbon atoms.

Additional sulfones contemplated by Formula VI above include those expressed by the formula:

(VII) 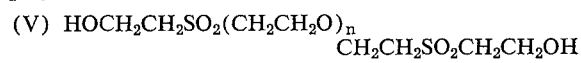

where R and R'' are hydrogen or lower alkyl, and in which $a$ is an integer from 1 to 5, $m$ has a value from 0 to 5, but if $m$ has a value of 1 to 5, then $a$ has a value of 2 to 3 only; and if $m$ is 0, then $a$ has a value of at least 3; the $—C_aH_{2a}—$ moiety can be branched or straight chained; and R' is selected from the group consisting of hydrogen and methyl.

Still further sulfones contemplated by Formula VI include:

(VIII) $(ROCH_2CH_2SO_2)_bC_aH_{(2n+1)-b}SO_2CH_2CH_2OR''$ where R, and R'' have the same meaning as in Formula VII above, $a$ has a value from 1 to 5 and $b$ has a value from 1 to 3.

The new reaction products or crosslinked polymeric ethers are obtained by reacting soluble polymeric materials containing a plurality of free hydroxyl groups per polymeric molecule, Pol-OH, with the sulfones of Formulae I through VIII above. By way of example, this reaction is illustrated by:

$2Pol\text{-}OH + HOCH_2CH_2SO_2QSO_2CH_2CH_2OH$
$\rightarrow Pol\text{-}OCH_2CH_2SO_2QSO_2CH_2CH_2O\text{-}Pol + 2H_2O$ where Q has the same meaning as in Formula I above.

The formation of ethers by the reactions shown above under mild conditions of temperature and catalysis is completely unexpected and surprising since the formation of ethers normally requires reaction of a hydroxyl compound with an alkylating agent such as a halide, sulfate, etc. The sulfones of the present invention, however, are not alkylating agents in the sense in which the term is used in the art. The compounds containing the grouping $ROCH_2CH_2SO_2—$ thus possess unexpected properties, and this is believed to be an important discovery.

The reaction between the sulfones disclosed herein and polymeric material can be carried out, for example, by contacting the polymer with a solution containing the sulfone and as a catalyst, an alkaline material such as an alkali salt of weak acid (e.g. sodium acetate, potassium bicarbonate, alkali metal carbonate and the like) or an alkali hydroxide in low concentration of a non-volatile organic base, drying the polymer so treated, and heating the product thus treated for a brief period. Alternatively the polymer can be pretreated with the alkaline catalyst, then with the solution of the sulfone and thereafter dried and heated. On the other hand, the polymer can be pretreated with the sulfone solution, and the catalyst may be applied in a subsequent step. The choice of procedure depends in part on the solubility characteristics of the specific sulfone employed as a crosslinking agent.

Catalysts which are effective for the process of the invention are generally alkaline or potentially alkaline catalysts including non-volatile organic bases, alkali hydroxides and alkali salts of weak acids. The acetates and bicarbonates of an alkali metal are preferred since they are economical and do not cause discoloration when the polymer is heated in their presence. Alkali metal carbonates, hydroxides, phosphates, silicates and borates are also operative. Generally speaking, alkali salts of acids which have an ionization constant lower than about $10^{-4}$ may be used over a wide range of reaction conditions, while alkali hydroxides are effective only when the reaction conditions are carefully selected to minimize side reactions. Non-volatile organic bases may also be used. Quaternary ammonium hydroxides are approximately equivalent in their effectiveness to alkali metal hydroxides. Non-volatile tertiary amines may also be used providing the pH of their aqueous solutions is about 10 or higher and providing also that their boiling point is sufficiently high to avoid evaporation of the catalyst during the drying step. For example, 1,1,3,3-tetramethyl guanidine (B.P. 159–160° C.) is moderately effective as a catalyst. Primary and secondary amines are not desirable catalysts since the hydrogen atoms linked to the amino groups react with the beta-oxysulfones, and the primary or secondary amine thus competes with the polymer for the available sulfone reagent.

The concentration of catalyst required is a function of the amount of crosslinking agent employed of the specific catalyst selected (equivalent weight and alkalinity), and of the time of heating. Concentrations ranging from about 5% to about 150% based on the weight of crosslinking agent are effective. When the alkaline catalyst employed is a strong base as for example in the case of alkali hydroxides and quaternary ammonium hydroxides, the amount used should be preferably between 5% and 50%, based on the weight of crosslinking agent employed, since larger amounts tend to cause discoloration and degradation of the polymer. When the alkaline catalyst is a weak base, as for example in the case of alkali acetates and bicarbonates, the amount used may be varied within wide limits and amounts varying from about 20% to about 150%, based on the weight of crosslinking agent employed may be used with excellent results. Larger amounts of catalyst generally tend to increase the reaction rate. When a tertiary amine is used as catalyst, the amount required depends on its ionization constant (as indicated by the pH of its aqueous solutions) and also on the amount which may be retained in the polymer in the course or drying and heating. This in turn depends on the vapor pressure of the amine compound, and on the reaction conditions employed.

The time of heating which is required in order to bring the reaction to substantial completion ranges from about 10 seconds upward after removing the water present, and depends on the temperature of heating and the other reaction conditions selected. The preferred time range is about 30 seconds to five minutes. The temperature at which the reaction takes place ranges from about 60° C. (140° F.) to about 200° C. (392° F.) with a preferred range being from about 100° C. to 180° C. After the reaction it is desirable to wash the treated material in order to remove residual unreacted crosslinking agent and catalyst.

The preparation of the above sulfone compounds is fully described in copending application Ser. No. 77,027 filed Dec. 20, 1960, now abandoned. The entire disclosure of the above application is incorporated herein by reference.

The following examples are illustrative of the present invention and are not considered as limiting the invention in any way.

EXAMPLE I

A cotton twill fabric is impregnated on a laboratory padder with a solution containing 30 grams per liter of polyvinyl alcohol resin (for example the product marketed under the trade name of Gelvatol 1–90 by the Shawinigan Resin Corporation), 30 grams per liter of bis-beta-hydroxyethyl sulfone and 20 grams per liter of potassium bicarbonate. The pressure of the pad rolls is adjusted so that the fabric retains a weight of solution equal to its weight (100% wet pickup). The fabric so treated is dried at 200° F., cured 5 minutes at 300° F., and washed to remove soluble materials. In the course of this process the polyvinyl alcohol resin has been insolubilized, and the finish deposited on the fabric is not removed in laundering. If for example the stiffness of the treated cloth is measured by known methods, and compared with the stiffness of untreated cloth, and cloth treated with polyvinyl alcohol only, the following values are obtained:

|  | Stiffness value [1] | |
|---|---|---|
|  | Initial | After 5 launderings |
| Fabric treated according to Example I | 20 | 35 |
| Fabric treated with polyvinyl alcohol only | 35 | 95 |
| Untreated fabric | 125 | 130 |

[1] Expressed as the sum of the angles of deflection obtained in the warp and filling direction on a Monsanto crease recovery tester; maximum stiffness=0°, minimum stiffness=180°.

It is apparent that the stiffness of the fabric treated with polyvinyl alcohol only is lost in the course of laundering, and that the effect of the polyvinyl alcohol is retained through laundering by insolubilizing the resin size according to our process.

EXAMPLE II

When the procedure of Example I is repeated, using starch (for example, the product known as Kosol and manufactured by the National Starch and Chemical Co.) in place of polyvinyl alcohol, the following results are obtained:

|  | Stiffness value | |
|---|---|---|
|  | Initial | After 5 launderings |
| Fabric treated according to Example II | 30 | 45 |
| Fabric treated with starch only | 80 | 120 |
| Untreated fabric | 125 | 130 |

Whenever desired, other finishing agents may be combined with the crosslinking agents of our invention in order to achieve other specific properties. For example, softeners, bacteriostatic agents, water repellents, stiffeners and the like may be included in the treating solutions if desired, without impairing the efficiency of the process. The choice of specific finishing agents is limited only by their chemical compatibility in the system, and within this framework of chemical stability, any mixture or combination of reactants may be used.

The crosslinking treatments may be used in the treatment of hydroxylated polymers. Sizing materials such as starch and polyvinyl alcohol resin may be insolubilized "in situ" (on the fiber, yarn or fabric) and thus rendered resistant to washing, as illustrated by Examples I and II. Fibers manufactured from polyvinyl alcohol may also be improved by the crosslinking treatments, since they are rendered resistant to water. Many other useful applications of the new compounds and processes are possible.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A method of sizing a cellulosic textile material whereby the sizing agent is insolubilized in situ on the textile and thereby rendered resistant to washing which comprises impregnating the cellulosic textile fabric with starch and thereafter reacting the starch in the presence of an alkaline catalyst with a cross-linking agent consisting essentially of a polyfunctional sulfone corresponding to the formula:

or

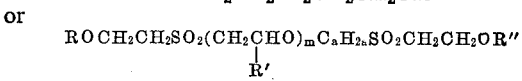

in which $a$ has a value of 1 to 5, $m$ has a value of 0 to 5 but when $m$ is 1 to 5 than $a$ has a value of 2 or 3 only and if $m$ is 0, than $a$ is 3 to 5, R and R″ are hydrogen or alkyl containing from 1 to 4 carbon atoms and R′ is selected from the group consisting of hydrogen and methyl.

2. A method of sizing a cellulosic textile whereby the sizing agent is insolubilized in situ on the textile and thereby rendered resistant to washing which comprises impregnating said textile with polyvinyl alcohol and thereafter reacting the polyvinyl alcohol in the presence of an alkaline catalyst with a cross-linking agent consisting essentially of a polyfunctional sulfone of the formula:

or

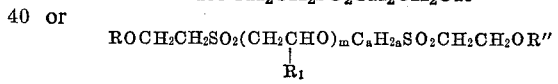

in which R and R″ are members selected from the group consisting of hydrogen anl alkyl containing from 1 to 4 carbon atoms, $a$ is an integer from 1 to 5, $m$ has a value of 0 to 5 but when $m$ is 1 to 5 then $a$ is 2 or 3 only, and if $m$ is 0 than $a$ is 3 to 5, and $R_1$ is selected from the group consisting of hydrogen and methyl.

References Cited

UNITED STATES PATENTS

| 2,524,399 | 10/1950 | Schoene et al. | 8—116 |
| 2,524,400 | 10/1950 | Schoene et al. | 8—116 X |
| 3,000,762 | 9/1961 | Tesoro | 8—120 X |
| 3,031,435 | 4/1962 | Tesoro. | |
| 3,106,439 | 10/1963 | Valentine et al. | 8—116 |
| 3,173,750 | 3/1965 | McDowell | 8—116 |
| 3,218,118 | 11/1965 | Steele et al. | 8—116 |
| 3,222,119 | 12/1965 | Tasklick et al. | 8—116 |

OTHER REFERENCES

Tesoro, Textile Research Journal, vol. 32, p. 189 (1962) 8-sulfone.

Borghetty et al. American Dyestuff Reporter, pp. 34–37, Feb. 4, 1963.

Welch, Textile Research Journal, vol. 33, pp. 165–167 (1963).

GEORGE F. LESMES, Primary Examiner

J. CANNON, Assistant Examiner

U.S. Cl. X.R.

8—115.5, 120; 260—78, 79.3, 91.3, 120, 123, 231